US007035825B1

(12) United States Patent
Sturtevant et al.

(10) Patent No.: US 7,035,825 B1
(45) Date of Patent: Apr. 25, 2006

(54) MANAGING RELATIONSHIPS OF PARTIES INTERACTING ON A NETWORK

(75) Inventors: Reed Padi Maw Sturtevant, Lexington, MA (US); George A. Eberstadt, New York, NY (US); Jeffrey A. Kresch, Boston, MA (US)

(73) Assignee: E.Piphany, Inc., San Mateo, CA (US)

( * ) Notice: Subject to any disclaimer, the term of this patent is extended or adjusted under 35 U.S.C. 154(b) by 0 days.

(21) Appl. No.: 09/478,112

(22) Filed: Jan. 4, 2000

(51) Int. Cl.
*G06F 17/60* (2006.01)

(52) U.S. Cl. .......................................... 705/51; 713/166
(58) Field of Classification Search .................... 705/9, 705/51–54, 64; 713/156–157, 166, 200–201; 707/9–10
See application file for complete search history.

(56) References Cited

U.S. PATENT DOCUMENTS

| 5,173,939 | A | * | 12/1992 | Abadi et al. .................. 380/25 |
| 5,678,041 | A |   | 10/1997 | Baker et al. |
| 5,761,669 | A | * | 6/1998 | Montague et al. .......... 707/103 |
| 5,815,665 | A |   | 9/1998 | Teper et al. |
| 5,822,518 | A |   | 10/1998 | Ooki et al. |
| 5,826,268 | A |   | 10/1998 | Schaefer et al. |
| 6,038,563 | A | * | 3/2000 | Bapat et al. .................. 707/10 |
| 6,044,466 | A | * | 3/2000 | Anand et al. ................ 713/200 |
| 6,073,242 | A | * | 6/2000 | Hardy et al. ................. 713/201 |
| 6,085,191 | A | * | 7/2000 | Fisher et al. .................... 707/9 |
| 6,092,196 | A |   | 7/2000 | Relche |
| 6,105,063 | A | * | 8/2000 | Hayes, Jr. .................... 709/223 |
| 6,178,505 | B1 | * | 1/2001 | Schneider et al. .......... 713/167 |
| 6,182,226 | B1 | * | 1/2001 | Reid et al. .................. 713/201 |
| 6,189,104 | B1 |   | 2/2001 | Leppek |
| 6,233,576 | B1 | * | 5/2001 | Lewis ............................ 707/9 |
| 6,253,216 | B1 | * | 6/2001 | Sutcliffe et al. ............ 707/500 |
| 6,339,826 | B1 |   | 1/2002 | Hayes, Jr. et al. |
| 6,584,568 | B1 | * | 6/2003 | Dircks et al. ............... 713/201 |

FOREIGN PATENT DOCUMENTS

EP       0 447 3391 A2 *   9/1991   ................... 91/38

OTHER PUBLICATIONS

Gibbs et al., "The Defenders. (software for protecting yourself online) (Buyers Guide)", PC World, v16, n9, p140 (1), Sep. 1998, ISSN: 0737-8939.*

* cited by examiner

*Primary Examiner*—Mary D. Cheung
(74) *Attorney, Agent, or Firm*—Bingham McCutchen LLP; Fabio E. Marino; Saina S. Shamilov

(57) ABSTRACT

A digital facility is made available from a source to users via an electronic communication medium. At least one of the users is associated with an access permission that enables the user to access at least one of the digital facilities. At least one of the users is associated with a grant permission that enables the user to give to another user a permission with respect at least one of the digital facilities.

24 Claims, 3 Drawing Sheets

MANAGING RELATIONSHIPS OF PARTIES INTERACTING ON A NETWORK

CROSS-REFERENCE TO RELATED APPLICATION

This application is related to co-pending U.S. application Ser. No. 09/477,254, filed Jan. 4, 2000.

BACKGROUND

This invention relates to managing relationships of parties interacting on a network.

A party that has information to be made available to other parties with which it has or wishes to have relationships can disseminate the information to the other parties on a web site using a web server that is accessible by web browsers.

In a commercial context, for example, a manufacturer may try to increase sales of its products or services by giving better information and support to resellers or other companies that are in the chain of distribution between the manufacturer and end customers. On the other hand, the manufacturer may want to screen a particular type of customer from having access to information that is not targeted to that type of customer.

Access to the information by different parties can be regulated by firewalls, by password techniques, and in other ways.

SUMMARY

In some implementations, the invention regulates access to information in a way that enhances business relationships among companies and their employees.

In one general aspect, the invention features making at least one digital facility available from a source to users via an electronic communication medium; associating with at least one of the users an access permission that enables the user to access at least one of the digital facilities; and associating with at least one of the users a grant permission that enables the user to give to another user a permission with respect to at least one of the digital facilities.

Implementations of the invention may include one or more of the following features. The permission may include a perform permission (also called a perform right) or a grant permission (also called or a grant right). The digital facility may include data or a service. The source may be a web server. The users may be individual employees of companies and may use web browsers. The electronic communication medium may be the Internet. A user may be given both perform permission and grant permission. The digital facility may include an application program that defines the permissions. The users may be individuals who are associated with respective companies, and the permissions may include company permissions that apply to individuals associated with one of the companies and individual permissions that apply individually to a user. At least one of the permissions may include an aggregate of other permissions. The aggregate permission may include fundamental permissions that have arguments of a common type. A user's permission may be determined by a combination of individual permissions and company permissions.

In general, in another aspect, the invention features making business information of a portal-providing company available to individuals using a web server and web browsers; associating with at least one of the individuals a perform permission that enables the user to access the business information; and associating with at least one of the users a grant permission that enables the user to give to another user a permission with respect to the business information.

In general, in another aspect, the invention features providing a web site; interacting with web browsers of users, in response to a request from a user to the web site, determining if the user has permission to have the request served, and enabling one of the users to grant to another of the users selectively either only a permission to have a particular type of request served, only a permission to grant other users the ability to grant permissions, or both.

In general, in another aspect, the invention features maintaining a database of information that associates each user of a digital facility available from a source with permissions that define the rights of the user to access the digital facility or to grant to other users the rights with respect to the digital facility, or both; and enabling users who have the permission to do so, to alter the permissions associated with the user.

Implementations of the invention may include one or more of the following features. The permission information may be stored as user profiles in the database. The users may interact with the database through a web server/web browser pair in altering the permissions. The users may belong to entities and the database may also store information about permissions that define rights of all of the users who belong to a given one of the entities. The database also may store information about aggregate permissions that comprise pre-defined sets of individual permissions.

In general, in another aspect, the invention features maintaining a database of profiles that define permissions of users and companies to access the digital facility, authorizing at least one user to create profiles for other users or companies, and automatically making a user who creates a profile for another user or for a company, a manager of the profile of the other user or the company.

Among the advantages of the invention are one or more of the following. The system enables the portal-providing company and other companies interacting through the portal to make better use of their marketing and sales people and resources. The portal-providing company and other companies interacting through the portal can use the system to motivate their selling partners to achieve higher sales. The impact and reach of the portal-providing company's direct sales people and the front-line teams of other companies interacting through the portal can be improved. Selling partners and customers develop a greater awareness of the portal-providing company and other companies interacting through the portal. Selling partners are given enhanced marketing capabilities. The portal-providing company and other companies interacting through the portal can present a single coordinated image to selling partners and customers while providing custom experiences for individual users. The system also enables improvement of the performance of many other business processes that occur between and within companies. These improvements may take the form of reduction in the time required to execute. The system can improve the performance of interactions with a company's suppliers and vendors. It can also improve the performance of processes that occur after a business transaction, including the execution of implementation projects, service, and support. And it can improve the performance of a wide range of internal company processes.

Other advantages and features will become apparent from the following description and from the claims.

DESCRIPTION

OVERVIEW

Figure 1:
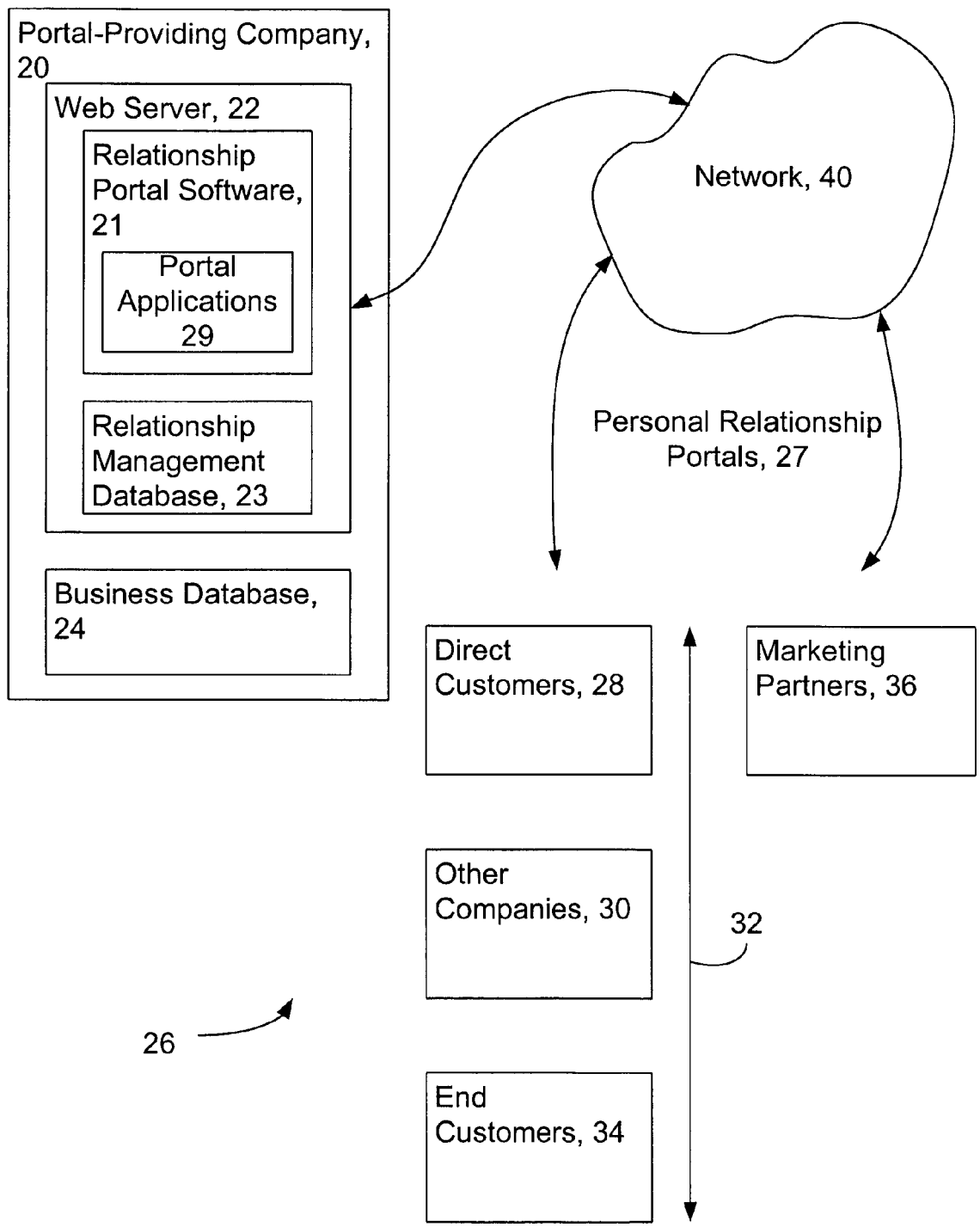
FIG. 1 is a block diagram of a relationship management system.

As shown in FIG. 1, a portal-providing company 20 can use relationship portal software 21 running on its web server 22 to leverage the value of information stored in its business database 24. Software 21 can be used to regulate relationships that the portal-providing company has with other parties 26, including the portal-providing company's direct customers 28, other companies 30 along a chain of distribution 32, end customers 34, and marketing partners 36. The software can also be used to regulate relationships that parties in the chain other than the portal-providing company have with each other (e.g., a relationship between a direct customer and an end customer), at least to the extent that the relationship involves the portal-providing company's information.

The business database 24 can be an existing database or a newly created database. Typically the business database would include information about products or services, prices, terms, availability, marketing plans, historical and projected sales, and any other information that would be useful in facilitating the relationships among the companies and employees who are authorized to use the system.

The regulation of relationships by software 21 can include control of which information of the various companies that participate in the portal environment is made available to which other companies and to which employees of those companies. The regulation can also include control of how the information is presented to the employees of the companies to enable the delivery of different "experiences" to different companies and their employees. In that way, the software 21 and the web server 22 can provide a personal relationship portal 27 that can have custom appearances and behaviors for each of the employees that communicates with the web server through a web browser. Each employee of any of the companies can get access to the web server from anywhere in the world through a network 40 that could be, for example, the Internet, an Intranet, a local area or wide area network, a dial up connection, or any other arrangement that allows communication between the employee's web browser and the network.

Software 21 provides two main functions: configuration of the software to serve a portal-providing company and its relationship partners, and run-time operation of the software to provide the personal relationship portals to employees of the companies.

The configuration function includes identifying and creating profiles for companies and employees of companies who will have access to the system, and defining the relationships among the companies and employees, the rights that each company and employee will have to use the system, and the preferences of each employee that together establish the nature and content of each employee's personal relationship portal. The configuration information is kept in a portal management database 23 associated with software 21.

Run-time operation includes conveying each of the personal relationship portals to web browsers in accordance with the configuration and information contained in the portal management database 23 and in the business database 24. In addition to providing information, each personal relationship portal can provide functions and services to the employee using the browser.

A wide variety of hardware and software can be used to implement the web server 22 The relationship portal software 21 and the portal management database 23 may be based on an appropriate set of platforms that can include Microsoft Transaction Server (MTS) and Microsoft Internet Information Server (IIS). The relationship portal software may take advantage of typical web software capabilities including Active Server Pages (ASP), Component Object Model (COM) objects, Java, Extensible Markup Language (XML), and ActiveX Database Objects (ADO). In one implementation, the relationship management software comprises a Java class library that implements a suite of portal applications 29. The portal applications provide both the configuration capabilities and run-time features of the system. Other platforms may be used in implementations of the invention, including BEA Systems WebLogic Server, IBM WebSphere Application Server, Java Server Pages (JSP), Enterprise Java Beans (EJB) and Java Database Connection (JDBC).

The relationship portal software may include a generic schema for the portal management database 23. The database initially includes seeded descriptive data in the form of query scripts. The Java class library can "talk to" the database, i.e., gather data from the database, manipulate the data, and store data in the database. The relationship portal software includes HTML web pages and/or can include ASPs that can communicate with the Java class libraries using COM communications. The server distributes the resulting web pages in the form of personal relationship portals to the user browsers.

The relationship portal software handles two types of parties: users and companies. A user is a person who is employed by or is otherwise associated with ("belongs to") a company. Information about users, groups of users, and companies is generated as part of the configuration process. The information is stored and maintained as profiles in tables in the portal management database 23.

The profiles include two important classes of information, called permissions and preferences. The permissions define the rights of users and companies with respect to information and functions that are made available by the portal applications. Permissions are granted by users of the system in ways (described below) that enable the development of a rich, distributed fabric of personal relationship portals for a range of users and companies who are in the constellation of interest of the portal-providing company. All of the personal relationship portals are implemented from the portal-providing company's server, but the particular permissions and preferences of any one of the personal relationship portals are not necessarily fully controlled by the portal-providing company. Rather the ability to control them is distributed so that other companies within the constellation and other users in those companies may be able to influence the configurations and permissions associated with some of the portals. How this is done will be explained more fully below.

Preferences define how the user wishes to receive the information and services made available by the portal applications. Permissions and preferences are similar in that they are unique named objects defined by a portal application. Actual permission values for a user represent specific access rights to application functionality, whereas specific preference values influence application behavior.

User Profiles and Company Profiles

It may be required that a profile for a company to which a user belongs must exist before a profile for the user can be created.

A company profile can include demographic data; lists of other companies with which the company has a relationship; in some implementations a list of the maximum permissions that users at the company can be given in creating or managing the profiles of other users and companies; and a list of other users who are allowed to manage the profile of the company. A user profile may include demographic data; permissions given to the user to create and manage the profiles of other users and companies; a list of permissions given to the user with respect to other objects in the system; a list of preferences of the user for his personal relationship portal; and a list of other users who are allowed to manage the profile of the user.

The user profile contains a listing of permissions to which the user has some level of perform permission (defined below). In one implementation, the maximum permissions available to a user are limited by the permissions assigned to the user's company. Once permissions are assigned to a user, the company permissions are not consulted in order to determine what facilities are available to the user. However, when company permissions are removed, they are also removed from all of its employees.

Once a user has been created, the "belongs to" relationship of that user to his company cannot be changed except to the extent that the user wanting to make the change has permission to do so.

A company profile can be created and exist independently of any other company or user. This conveniently enables company profiles to be created and to exist without users until a later time.

For users who are at the end of a relationship chain (e.g., who don't work for a company), such as shareholders, an artificial company profile in the name of, e.g., "Shareholders", could be created. The Shareholders company would be simply a grouping mechanism for those users.

Each user profile or company profile has a "profile manager". The profile manager is the user who has the permission to change settings and possibly delete the profile. These abilities are expressed in the "modify user profile" and "remove user profile" permissions. One or more aggregate permissions (discussed below) may be configured to set the manager permissions.

A person who has permission to, and who does initially creates a user is automatically the profile manager for the new user. The profile manager will have both perform and grant permissions of the aggregate permissions. The relationship between the permission to create an object and the permission to manage an object is configurable. The concept of managing an object derives from aggregate permissions, which are discussed below. Aggregate permissions often include fundamental permissions to view, modify and delete an object, which are aggregated into what is effectively a right to manage that object.

User profiles are created by other users. In another implementation, users are given permission to manage all users at particular companies and there are not user management permissions. A company profile is created by a user. The user who sets up a company profile automatically becomes a manager of that company's profile.

Some users may be allowed to create companies of certain types. Company types are themselves configurable and may differ from one portal installation to another. The users automatically become managers of the companies they create. Other users may be given permission to manage certain company profiles but not to create any. These company managers can change demographic data freely, but they can only change permissions to which they themselves have the grantright.

Groups

Permissions may also be assigned to users through the mechanism of groups. A group is a collection of users. A user with a grant right to a permission may give that permission to a group just as he or she would give it to an individual user. Once the permission has been given to a group it is automatically conferred on all members of that group. Users may become members of groups in two ways. First, a user who has the permission to manage a group can designate members individually. Second, a user who has the permission to manage a group can specify that users with a certain demographic profile will automatically be members of that group. Any user who becomes a member of a group immediately acquires all the permissions that have been given to the group. The use of groups simplifies administration of permissions by enabling a large number of permissions to easily be assigned by putting users in just a few groups.

Portal Builder Application

The configuration functions are provided by one of the portal applications, called "Portal Builder". Portal Builder enables users to view, modify, remove, and create user profiles and company profiles and in that manner to set the stage for personal relationship portals that are made available at run-time to users of the system. Each user has access to Portal Builder to view and modify portions of his own user profile. This capability is limited by the user's permissions with respect to him.

Specific functions of the Portal Builder, such as creating, modifying and removing user profiles, are available to a user only if the user has permission to access those functions. Typically those functions are used by individuals identified as relationship managers to configure personal relationship portals for customers of their companies.

Portal Builder displays web pages to present and collect the demographic data about users and the companies they work for and to establish user permissions and preferences defined by portal applications. As a portal application, Portal Builder defines its own set of permissions that control how it can be used and that it also manages when configuring a personal relationship portal.

A portal application uses the Portal Builder to define permissions that must exist for a user to make use of the application. The Portal Builder assumes the responsibility for gathering that information on behalf of the other portal applications.

The table set forth in appendix A lists the fundamental components of the profile service of the Portal Builder in one implementation. A user interacts with the Portal Builder through a series of web pages that walk the user through a process. The screens associated with the web pages for one implementation are listed in the table of Appendix B.

Permissions

The ability of a user to access the functions and information available through the relationship portal software 21 is governed by a system of permissions. The experience of a user on his personal relationship portal is determined in large part by the permissions that he has. The permissioning architecture is highly adaptable and highly granular. The identity and scope of the permissions to which a user is entitled are determined by other users and are restricted by a set of rules that limit the ability of a user to grant permissions to other users. If carefully constructed, the fabric enables a portal-providing company, and other companies who participate in the system, to control the dissemination of information and the access to services in a way that enhances and facilitates their relationships with parties who can advance their interests. Conversely, dissemination of information and the access to services can be restricted for parties who can injure the interests of the portal-providing company.

A permission specifies the right that a user may be given to access the functions of a portal application. Roughly speaking, a permission is a capability to do "something" (through the medium of the portal application), perhaps with respect to "something else". For example, the something which a permission enables may be to change a profile of a company, or to modify a user profile, or to create a user, or create a company of a particular type. A permission has an argument, which refers to the "something else" to which the capability pertains. The argument can refer to any object in the system such as a company or a piece of data.

Each portal application 29 defines permissions that a user must have in order to access the application or specific functions of the application. The application defines the arguments of any permissions that it defines. A user may not access features and functions of portal applications unless the user has a "perform" permission (defined below) with respect to the feature or function. At run-time, the portal application uses permission information maintained by the Portal Builder to determine whether and how to respond to a user request.

The definitions of possible permissions are stored in a permission definition table in the portal management database. The actual specific permissions associated with a given user or company are stored as values in a party permission table of the portal database. Portal applications that are invoked by a user consult the party permission table to determine if a user has a needed permission.

A permission may (but need not) have an argument, a value specifying an entity to which the permission applies. For example, a permission to create a company carries an argument that identifies the type of company.

In one implementation, when the database table of permissions is initially created, there is one set of permissions granted to one person called the system administrator. These permissions give the system administrator the right to create and modify companies of all types. In this implementation, the system administrator company (a fake company whose sole employee is the system administrator) is also given this permission. The system administrator and company are also given other global permissions with respect to other applications. In another implementation, the system administrator is given a "wildcard" argument value to all permissions, which translates to the complete list of possible objects for each permission.

Company Permissions

In some implementations, permissions apply both to companies to which a user belongs and to the user himself. Although only individuals are direct users of relationship portals, permissions may be recorded for companies to which the people belong to enable further regulation of the permission fabric. The permissions that can be given to a user are constrained by both the permissions of the company to which he belongs and by the permissions of the user who is granting the permissions to the recipient. The permissions of a company (also called guard settings) define the maximum amount of permissions that a user who belongs to the company can be given. A user creating a new company asks, "What are the maximum amount of permissions that any user at this company may need?" and then gives the company those permissions. If a user who belongs to that company later needs more permissions, new company permissions must be added before the user can be given the permissions.

Perform Permissions; Grant Permissions; Cascading Permissions

Figure 2:
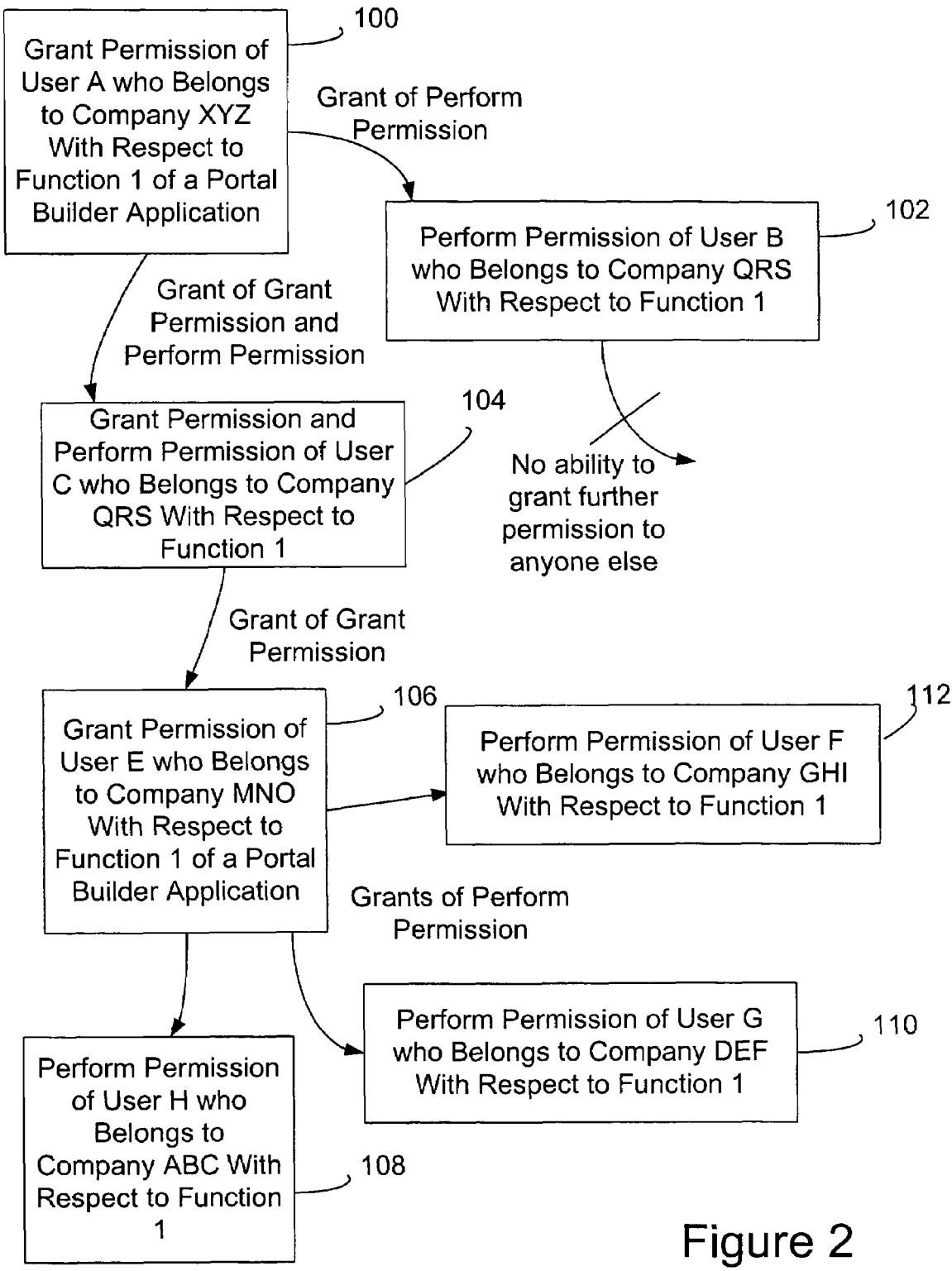
FIG. 2 is a schematic diagram of examples of the granting of perform and grant permissions.

A permission may specify either or both of two aspects of permission: a perform right and a grant right. The perform right of a permission (the "perform permission") gives a user the right to perform a specific function offered by a portal application. As suggested in the example shown in FIG. 2, the grant right of a permission (the "grant permission") gives a user the right to grant to other users the perform permission and the grant permission with respect to the application functionality associated with the permission. The grant and perform permissions are represented by flags in the profiles stored in the portal management database. As shown in FIG. 2, user A's grant permission 100 enables user A to grant perform permission 102 to user B and grant permission and perform permission 104 to user C.

A user (such as user B) who does not have the grant permission cannot modify the perform permission for any other user, either to add it or to remove it. A user who has the grant permission may give the perform permission or the grant permission or both to another user. In this way, the "cascading" of permissions can continue without limit as long as each user gives grant permissions to next users in the cascade. In FIG. 2, user C can give grant permission 106 to user E who works in another company and user E can then give perform permissions 108, 110, 112 to three other users F, G, and H in three other companies.

The result can be cascading tiers of personal relationship portals. For example, a selling partner or customer of the portal-providing company can create personalized branded web sites for its customers or downstream partners and can reuse information and services available on the portal-providing company's portal.

A user (such as user A) can have the grant permission without having the perform permission. This is natural, because a user may be responsible for managing the permissions of users who have responsibilities that the manager himself does not have. For example, a sales person may be responsible for managing the permissions of all users at an account. One of those users may be a lawyer. The sales person must be able to set up the lawyer's permissions but should not have access to the legal content. Although it would be possible for a malicious user to create a fake user and log in as the fake user to get access to functions not meant for him, that act would create an easily traceable trail.

Cascading Permissions and User/Company Relationships

The link between cascading permissions and the relationships of users to companies is suggested by what happens to user permissions when a change occurs for the company to which the user belongs.

For example, suppose that a company is initially defined in the portal management database as a "Tier I" company (e.g., a large or highly profitable company). The portal-providing company wishes to permit Tier I companies to have only the ability to submit questions to an Ask the Expert application, and companies of all other Tiers to have only the ability to read the questions and answers.

If the Tier I company becomes less profitable and falls beneath the Tier I threshold, the company and its users will need to be switched into the Tier II category. The effect of the switch should be to remove from users who belong to the company the ability to submit questions to Ask the Expert and leave them only with the ability to read.

Conversely, suppose that a company is initially recorded as a "Tier II" company. Because the portal-providing company only wants Tier I companies to have the ability to submit questions to the Ask the Expert portal application while giving all other Tiers only the ability to read, this company may only read postings to Ask the Expert.

If the company becomes more profitable, the company can be switched to Tier I in the database to give its users the ability to submit questions to Ask the Expert.

When additional permissions are added to a company, the user who is making the change to the company record can pick and choose manually which users of the company should have their permissions changed. When permissions are removed from a company, all users belonging to that company should lose the removed permission.

Fundamental Permissions

Examples of basic permissions (called "fundamental permissions") that a portal application might define and invoke are shown in the table contained in Appendix C.

Detailed explanations of four possible permissions follow.

Create Company—This permission gives the user the ability to create new company profiles in the portal management database. A user who has this permission is automatically given the remaining permissions, described below, for a company that he creates.

Modify Company—This permission gives the user the ability to modify the permissions of existing companies. The permission includes the permission to modify the permissions of all users belonging to that company and to create new user records belonging to that company. The argument of this permission is the list of companies that the user may be allowed to modify. The grant permission of this permission specifies which companies the user can give other users the ability to modify.

Create Company User—This permission gives a user the ability to create other users. The argument of this permission is the list of companies at which this user may create users. The grant component of the permission specifies the companies at which the current user may enable other users to create users.

Modify Company User—This permission enables a user to modify the permissions of specific users. The argument of this permission is the list of companies at which this user may modify users. The grant component of the permission specifies the companies at which the current user may enable other users to modify users.

Aggregate Permissions

Figure 3:
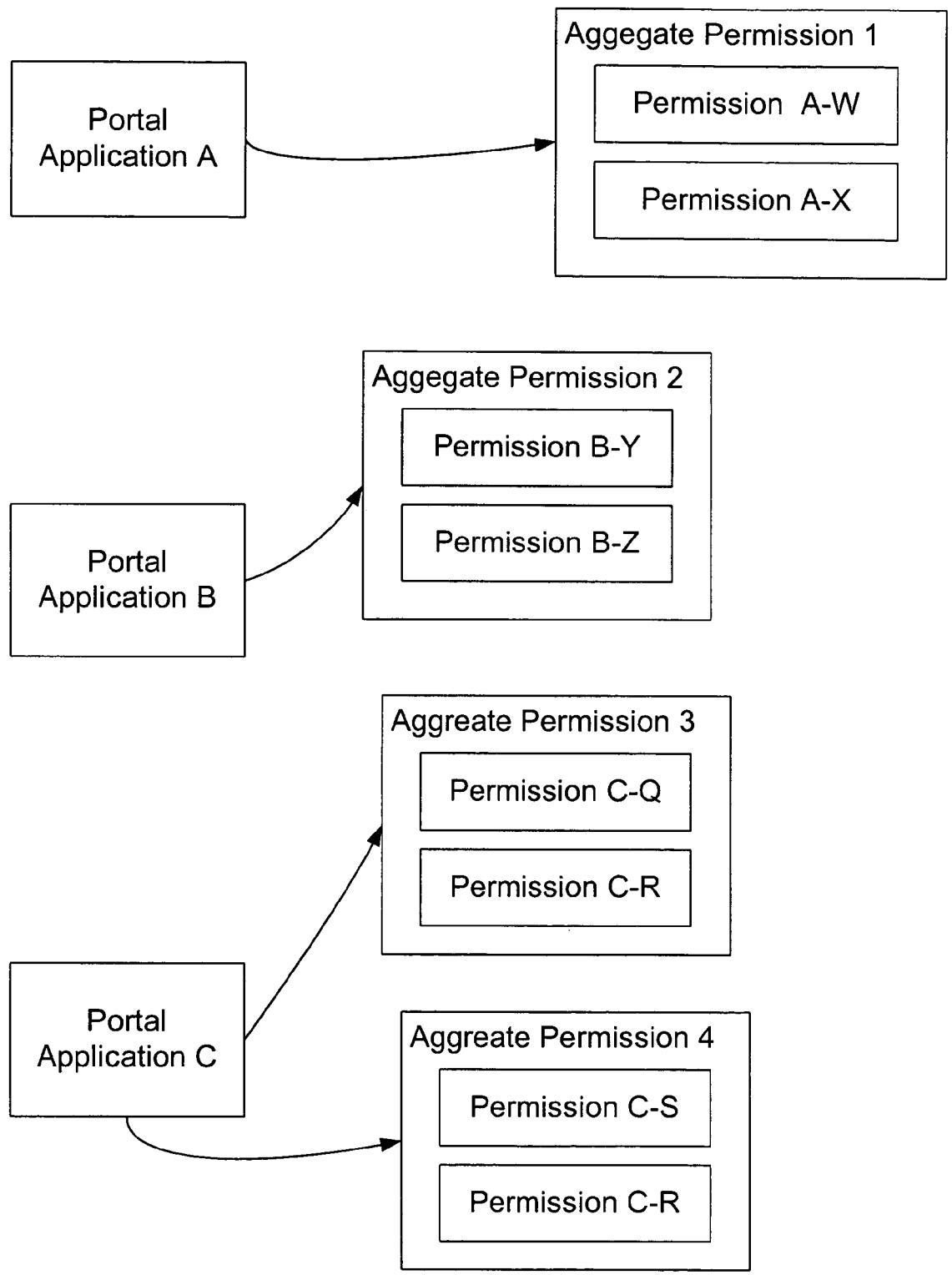
FIG. 3 is an illustration of aggregate permissions.

Because the fundamental permissions are so granular, it is also convenient to provide an "aggregate" permission capability. As shown in FIG. 3, an aggregate permission 1, 2, 3, or 4 is defined by the portal application A, B, or C that may invoke the permission at run-time. An aggregate permission is not a permission by itself but only a defined aggregation of permissions. The fundamental permission definitions are stored in one table in the portal management database. The aggregate permission definitions are stored in another table, and the mappings between the aggregate permissions and the fundamental permissions are stored in a third table. The permission values, the actual settings for a person or company, are stored in yet another table. This table includes the fundamental permission value and the aggregate it is associated with. The reason for this is that in the case of overlapping aggregates (see below), the same fundamental permission may have different values. The rule is that the value with the greatest rights wins. When one of the overlapping aggregate permission values is removed, the fundamental permission values associated with the other overlapping aggregate permission is retained.

Every aggregate permission is associated with one portal application. The aggregate permission 1 incorporates permissions A–W, A–X, and so on, in each case only for the portal application with which it is associated. A portal application C, for example, may be associated with more than one defined aggregate permission 3 and 4. Aggregate permissions may overlap, meaning that they map to the same underlying, fundamental, permissions.

Users of the Portal Builder who are creating or modifying user permissions may work only at the aggregate permission level, not at the individual application permission level. A user profile is defined by one or more selected aggregate permissions, and the users only need to know how to select aggregate permissions for users. A user who has a relationship manager responsibility will dispense that responsibility at the aggregate permission level.

Each aggregate permission is given a name that describes, for example, a form of business function, usually in the context of the portal application that defines that permission. Portal application permissions that need to be accessible to someone whose role is to fulfill the business function are enabled with the perform aspect of the aggregate permission.

Certain portal applications that may be considered critical services are always enabled for every portal user. This can be done by providing a mechanism to enable permissions of those applications without use of the aggregate permissions model and without requiring user action.

Setting the perform or grant rights of an aggregate permission is equivalent to setting those rights for all of the constituent fundamental permissions.

Aggregate permission definitions are stored in an aggregate permission database table. The table is initialized when a portal-providing company's portal is installed, but unlike fundamental permissions, aggregate permission definitions can be modified without any corresponding change in applications that rely on the permissions that are part of the aggregate permission. However, the definitions are not modified after the portal is installed. Aggregate permissions make it easier to modify the configuration portion of an application without modifying the underlying application functionality. For example, new aggregate mappings can be installed in the database, and new screens can be created to set these aggregates, all without changing the application code that consults fundamental permissions to see what actions are allowable. Nevertheless, all of these definitions are put in place before a portal is installed.

Example of Aggregate Permissions

Assume that the fundamental permissions include:

Create Company, argument is company type. User can create companies of the specified types.

Modify Company, argument is company. User can modify the profiles of the specified companies.

Delete Company, argument is company. User can delete the profiles of the specified companies.

Create Company Users, argument is company. User can create users at the specified companies.

Modify Company Users, argument is company. User can modify the profiles of users at the specified companies.

Delete Company Users, argument is company. User can delete the profiles of users at the specified companies.

Assume that the aggregate permissions include:

Company Creator, argument is company type. Maps to Create Company and functions the same way.

Company Manager, argument is company. Maps to Modify Company, Delete Company, Create Company Users, Modify Company Users, and Delete Company Users. User can modify and delete company profiles, and create, modify and delete users profiles at the specified companies.

Company User Manager, argument is company. Maps to Create Company Users, Modify Company Users, and Delete Company Users. User can create, modify and delete users at specified companies.

Assume that the system administrator and company have perform and grant permission for all values of Company Creator aggregate.

When the system administrator creates company A, he automatically becomes the Company Manager and Company User Manager of company A. He gives company A perform and grant rights to the Company Manager and Company User Manager aggregate permissions for company A. All users at company A now have the potential to manage the company profile and the profile of all users at the company.

If system administrator creates user B at company A and gives him the full set of permissions allowed to company A, user B can manage the company profile, and create and manage all user profiles at the company, but he cannot create any new companies.

If user B creates user C at company A and gives her perform rights to the Company User Manager aggregate permission for company A, then user C can create and manage the profiles of all users at company A, but cannot manage the company profile itself, and cannot give anyone else the right to manage user profiles at the company.

User Preferences

A user's profile includes preferences, which capture how the user wants to set up his personal relationship portal and to receive information. The preferences that are available to a user are limited by the user's permissions.

A portal application may specify preferences that generally control how a feature will operate within the portal application, provided the user has the permission to use that feature. An example of a preference is a selection of seven of ten available news channels to be displayed in a news application. The permission is the ability of the user to access the news application; the preference is what news sources will be displayed.

Preferences are only associated with users, not with companies, because preferences are more closely related to how a user makes use of a user portal.

Preferences are specific to one user only. Preferences cannot be cascaded. When a user is granted permission to access a portal application, the application automatically gives the user access to all relevant preferences.

For example, suppose that preferences "sort order" and "filter by" pertain to view and modify permissions of a particular portal application and that the preference "confirm before delete" pertains to the "remove" permission for that portal application. If a user does not have access to the "remove" permission, when the preferences page is generated for a user, the portal application is coded not to display the "confirm before delete" preference.

When a user is initially created, his preferences will default to a standard setting, regardless of the user type or company. Unless the user performing the user creation or modification purposely chooses to modify the user's preferences, the preferences remain in the default state.

Preference templates simplify the process of configuring a user's preferences. A preference template specifies the settings for a number of individual preferences. When a preference template is applied to a user, all of the user preferences are set as specified in the template. Preference templates can be applied by users to their own profiles, or they can be applied by a user's profile manager to that user's profile on his or her behalf.

Preference definitions are recorded in a table in the portal management database that includes, in one implementation, the name of the preference, a label for the preference, a flag indicating whether it accepts single or multiple values, a type code indicating whether the value is accepted as an input field, list, or set of choices, one or more default values for the preference, a set of values for the list elements or choices, an optional set of labels for the list elements or choices, and an optional set of default values for the list or choices (one value for an input field).

Actual preference values are stored in another database table in the portal management database.

Other Implementations of Relationship Management

In another implementation approach, companies may be defined as belonging only to specified types that correspond, for example, to their roles in a commercial supply chain, and each user can be defined as having only a specified role within the company to which he belongs. For example, the company types could include sales representatives ("reps") and suppliers who are represented by the manufacturers ("principals"). Within a rep company, a user could have a role as, for example, an outside sales rep, an inside sales rep, or a rep manager. Within a principal company, a user could have a role as a product manager or national sales manager, for example.

Relationships may be defined between parties of specified types and between individuals having specified roles in respective companies. For example, a product manager of a supplier may have a relationship with a sales representative of a vendor but may be denied a relationship with a product manager of the vendor. And individuals who belong to a supplier may not be permitted to have relationships of any kind with any individuals who belong to another supplier. In addition to companies and individuals, the system can control relationships between groups of individuals, for example, the client team for client X in company Y and a quality review team for vendor Y in client X.

The relationships can be used to govern the ability of the individuals, groups, and companies to access and use content and features maintained on a relationship server.

Among the content and functions that could be provided by the server in a given implementation are a new business application used to manage and track new business opportunities, requests for samples, action item tracking, electronic discussions, registration of companies and users by the setting up of profiles, an address book, and administrator functions that enable a designated administrator for a given company to control the creation and maintenance of user profiles and relationships and a designated system administrator for the portal-providing company of the server to control the creation and maintenance of company profiles.

The user interface that is presented through a browser to a given user depends on the user's role, on user and company profiles, and on definitions of relationships between individuals, groups, and companies. Among the facilities provided on various user interfaces are the ability to invite participation by users at other companies with which the company to which a user belongs has a relationship, to create a document, to manage (create, view, modify, and delete) commercial opportunities, to manage (create, view, modify, and delete) requests, to manage (create, view, modify, and delete) action items, to manage (create, view, modify, and delete) address books, and to control user preferences.

A company administrator also has user interface access to facilities for approving new users, approving new relationships, managing relationships, requesting relationships, altering a company profile, and viewing users. The overall system administrator is provided with user interface access to the ability to view companies and users.

For each function, each role of a user, and each company type to which the user belongs, the system defines permissions that determine whether a user having that role can access that function. The user interface is constructed to enforce the defined permissions.

The relationships between companies and between users are enforced by the implementation of the user interface based on the stored relationship information. For example, if a user does not have permission to view a specific company or a specific user, then the various lists and other interface elements that display to the first user companies and users with which he can interact will not include the non-permitted parties. In effect, the first user will have no way to know that the non-permitted parties even exist let alone any way to interact with them through the system. Thus, the user interface regulates and implements the permitted relationships for each user and company automatically based on the stored permissions.

Relationships are established as follows.

A new company may initiate a registration by providing appropriate fields of information for a profile through the user interface presented by the browser. The system administrator will review the information and either approve or disapprove the registration. The user who initiated the registration process for the company becomes the company administrator.

A user profile for a registered company is also created through the user interface presented by the browser. After the new user initiates the registration process by entering information needed for his profile, the record is presented to the company administrator who can approve or disapprove it.

Because the company profile and the user profile define the company type and the role of the user, the permissions applicable to such companies and users can be used to regulate the relationships. For example, the permissions may provide that a national sales representative of a rep firm can have a relationship with a product manager of a principal company with which his company has a relationship. Then, when a new product manager is added to a principal company, the new product manager automatically acquires the relationship permissions associated with new product managers of principal companies. The role that a user has within a company is controlled by the company administrator.

Setting up a relationship between one company and another (or between other parties such as individual users or groups) is initiated by the one company or party requesting the relationship with the other. The company administrator of the other company is presented with the request and decides whether to approve or reject the request. If approved the relationship is recorded on the system. As part of the approval process, the administrator is able to view a list of users who have certain roles for the company seeking the relationship. In a variation on this implementation, each party is assigned a "key" (a code sequence known only to authorized users). Any user who knows the key can use it to establish a relationship with the party to which the key applies. Transmittal of the key occurs through means outside of the portal. In this way, users that have an existing (or desired) business relationship can establish a portal relationship before they are able to use the portal as a communication mechanism between them.

In another implementation, the permission to establish a relationship between companies (or other parties such as individual users or groups) belongs to any user who is a manager of both the parties that will be involved in the relationship. In this case, parties cannot initiate the relationship building process themselves; it requires a third party.

The effects of the relationships between users and companies are determined by the types of companies and the roles that the individuals play in those companies. Permissions are applied automatically through relationship definitions. For example, a chain of people may have a relationship with respect to assembling and delivering content, for example, a product brochure. The same people may have no other relationship to one another with respect to a different set of activities.

Permissions can be driven based on attributes of a relationship. If each user's profile is defined to include demographic attributes such as geographical location, the right to see highly confidential information, and existing relationships with specified other parties, then another party can specify, for example, that he wishes to permit users who have certain demographic characteristics to receive a certain piece of marketing literature. In such a system, the relationships need not be governed by predefined roles, or by companies or groups to whom the users belong, or by pre-specified permissible relationships.

Other embodiments are also within the scope of the following claims. For example, the mechanism by which the user interacts with the system need not be a web browser. The user interaction can be governed by devices other than a web server. The parties who make use of the system need not be companies and their employees, but could be any entities and individuals who "belong" to them. The context in which the invention is implemented need not be based on business relationships, but could be based on any relationships that entities may wish to regulate.

APPENDIX A

| Component | Type | Description |
| --- | --- | --- |
| AggregateElement | Database table | Contains mappings between aggregate and fundamental permissions |
| AggregateElement | Java class | Manages the fundamental permissions associated with an aggregate permission |
| AggregatePermission | Database table | Contains aggregate permission definitions |
| AggregatePermission | Java class | Manages data associated with aggregate permission definitions |
| AggregateValue | COM object | COM wrapper for business logic |
| AggregateValue | Java class | Manages setting aggregate and fundamental permission values |
| PartyPermission | Database table | Relates Party objects to a set of permission values |
| PartyPreference | Database table | Relates Party objects to a set of preference values |
| PartyPreference | Java class | Manages data associated with preference values |

APPENDIX A-continued

| Component | Type | Description |
|---|---|---|
| PermissionValue | Java class | Retrieves individual permission values |
| PortalPermission | Database table | Contains application permission definitions |
| PortalPermission | Java class | Manages data associated with permission definitions |
| PortalPreference | Database table | Contains application preference definitions |
| PortalPreference | Java class | Manages data associated with preference definitions |
| PreferenceChoice | Java class | Manages data associated with preference choices |
| PreferenceDisplay | Java class | Formats permissions into XML for display |
| PreferenceManager | Java class | Manages the interaction between preference defaults and values |

APPENDIX B

| Screen Name: | Screen Description: |
|---|---|
| Start Menu: "My Preferences" | This is actually not a screen but a component of the Start Menu. This is the component that an end-user uses to access personalization features such as preference settings and access to demographic information contained in his/her profile. |
| Start Menu: "Portal Builder" | This is actually not a screen but a component of the Start Menu. This is the component that contains administrative features such as access to company and user profiles, sending password reminders, and managing templates. |
| Select User | This is an implementation of a standard selection screen. It allows a user to examine the full list of users s/he may access and select one for modification, removal, or choose to create a new user. |
| Common User Demographics | A data collection screen that every portal user is required to fill out. This is also the screen that allows the portal password to be set and changed. |
| Job Function Additional Data Collect | This screen contains a dynamic selection of data elements depending on the Job Function(s) selected for a user. The purpose of the screen is to capture data elements unique to the Function the user plays. |
| Select Aggregate Permissions (user profile) | This screen displays all aggregate permissions the user being modified may be given access to. |
| Application & Permission On-line Report | This screen displays to the user what applications and permissions are available to the user as a result of the selected aggregate permissions. |
| Configure Application Preferences | Allows for the configuration of application preferences. Only those applications to which the user has permission to use will be available for preference setting. |
| User Managers | This screen appears as part of user creation/modification and is used to identify what other portal users may update this user's profile. |
| Company Select | This is an implementation of a standard selection screen. It allows a user to examine the full list of companies s/he may access and select one for modification, removal, or choose to create a new company. |
| Common Company Demographics | A data collection screen that every portal company will be required to fill out. |
| Company Type Additional Data Collect | If additional data is necessary based on the Company Type selected, this screen is generated to collect those elements. |
| Select Aggregate Permissions (company profile) | This screen allows for the selection of aggregate permissions. These permissions define what this user may do in the portal environment. |
| Company Organization | This screen allows a company to define its internal organization (e.g. regions, branches, offices, etc.) This information is used as an attribute of each user and might be leveraged by portal applications. |

APPENDIX B-continued

| Screen Name: | Screen Description: |
|---|---|
| Company Managers | This screen appears as part of company creation/modification and is used to identify what other portal users may update this company's profile. |
| Company Profile Completed | This screen marks the end of a company profile creation or modification. Options exist here to determine how users at that company should be affected. |
| Password Reminder | Using the standard user selection screen, this form allows users to be selected and an e-mail sent to their e-mail address on file with a password reminder. |

APPENDIX C

| Permission | Argument | Description |
|---|---|---|
| Create Company Type | Company Type | Create companies of the specified type |
| View Company Type | Company Type | View companies of the specified type |
| Modify Company Type | Company Type | Modify companies of the specified type |
| Delete Company Type | Company Type | Delete companies of the specified type |
| View Company | Company | View specified company |
| Modify Company | Company | Modify specified company |
| Delete Company | Company | Delete specified company |
| Create Company User | Company | Create users at specified company |
| View Company User | Company | View users at specified company |
| Modify Company User | Company | Modify users at specified company |
| Delete Company User | Company | Delete users at specified company |
| View User | User | View specified user |
| Modify User | User | Modify specified user |
| Delete User | User | Delete specified user |

What is claimed is:

1. A method comprising:

making at least one digital facility available from a source to clients via an electronic communication medium;

associating with at least one of the clients a preference information that reflects one or more preferences of the client;

associating with at least one of the clients an access permission that enables the client to access at least one of the digital facilities;

associating with at least one of the clients a grant permission that enables the client to give to another client a user permission with respect to at least one of the digital facilities, in which the user permission with respect to at least one of the digital facilities is determined by a combination of an individual permission and a company permission;

creating a client profile for at least one of the clients based on the preference information and the permission information associated with the client; and managing relationships that are defined between clients via the electronic communication medium with respect to the digital facility based on the profiles of the clients.

2. The method of claim 1 in which the user permission that is granted to another client comprises a perform permission.

3. The method of claim 1 in which the user permission that is granted to another client comprises a grant permission.

4. The method of claim 1 in which the digital facility comprises data.

5. The method of claim 1 in which the digital facility comprises a service.

6. The method of claim 1 in which the source comprises a web server.

7. The method of claim 1 in which the clients comprise individuals using web browsers.

8. The method of claim 1 in which the clients are employees of companies.

9. The method of claim 1 in which the electronic communication medium comprises the internet.

10. The method of claim 1 in which the client can give another client both perform permission and grant permission.

11. The method of claim 1 in which the digital facility comprises an application program, and the application defines permissions grantable to clients.

12. The method of claim 1 in which the user permission comprises an aggregate of permissions.

13. The method of claim 12 in which the aggregate permissions of the user permission include fundamental permissions that have arguments of a common type.

14. A computer readable medium storing a software program that is capable of configuring a machine to perform a process comprising:
   making at least one digital facility available from a source to clients via an electronic communication medium;
   associating with at least one of the clients a preference information that reflects one or more preferences of the client;
   associating with at least one of the clients an access permission that enables the client to access at least one of the digital facilities;
   associating with at least one of the clients a grant permission that enables the client to give to another client a user permission with respect to at least one of the digital facilities, in which the user permission with respect to at least one of the digital facilities is determined by a combination of an individual permission and a company permission;
   creating a client profile for each of the clients, based on the preference information and the permission information associated with the client; and
   managing relationships that are defined between clients via the electronic communication medium with respect to the digital facility based on the profiles of the clients.

15. An apparatus comprising a computer readable medium storing a computer program, the computer program comprising:
   computer instructions for making at least one digital facility available from a source to users via an electronic communication medium;
   computer instructions for associating with at least one of the users a preference information that reflects one or more preferences of the user;
   computer instructions for associating with at least one of the users an access permission that enables the user to access at least one of the digital facilities;
   computer instructions for associating with at least one of the users a grant permission that enables the user to give to another user a permission with respect at least one of the digital facilities, the access permission or the grant permission with respect to at least one of the digital facilities is determined by a combination of an individual permission and a company permission;
   computer instructions for creating a user profile for each of the users, based on the preference information and the permission formation associated with the user; and
   computer instructions for managing relationships that are defined between users via the electronic communication medium with respect to the digital facility based on the profiles of the users.

16. An apparatus comprising:
   a source of digital facilities;
   an electronic communication medium coupled between the source and users to make at least one of the digital facilities available to the users; and
   storage means containing user profiles for each of the users, said user profiles are used to manage relationships that are defined between clients via the electronic communication medium with respect to the at least one digital facility, said user profile of each user comprising:
      preference information reflecting one or more preferences of the user with respect to at least one of the digital facilities;
      access information regarding the power of the user to access at least one of the digital facilities; and
      grant information regarding the power of the user to grant a permission to another user with respect to at least one of the digital facilities, the grant permission with respect to at least one of the digital facilities determined by a combination of an individual permission and a company permission.

17. A method comprising:
   making business information of a portal-providing company available to individuals using a web server and web browsers;
   associating with at least one of the individuals a preference information that reflects one or more preferences of the client with respect to the business information;
   associating with at least one of the individuals an access permission that enables the individual to access the business information;
   associating with at least one of the individuals a grant permission that enables the individual to give to another individual a permission with respect to the business information;
   authorizing at least a first individual to create an individual profile for a second individual, based on the preference information, access permission information, and grant permission information associated with the second individual; and
   automatically allowing the first individual to manage one or more relationships that are defined between the second individual with other individuals, via the electronic communication medium with respect to the digital facility, with the individual profile of the second individual.

18. A method comprising:
   providing a web site;
   using the web site, interacting with web browsers of users;
   in response to a request from a user to the web site, determining if the user has permission to have the request served in accordance with permission information contained in a user profile of the user;
   enabling, in accordance with permission information contained in a granting user's user profile, one of the users to grant to another of the users selectively either only a permission to have a particular type of request served, only a permission to grant other users the ability to grant permissions, or both;

authorizing at least one user to create a user profile for another user, the user profile including permission information and preference information for the user; and automatically making the user who creates the user profile for the other user a relationship manager of defined relationships of the other user with the profile of the other user.

19. A method comprising:

maintaining a database of information that associates each user of a digital facility available from a source with preference information that the defined preferences of the user with respect to the digital facility, and permissions that define the rights of the user to access the digital facility or to grant to other users the rights with respect to the digital facility, or both;

determining the permissions by a combination of an individual permission and a company permission;

creating user profiles for each of the users in the database, each user profile containing the preference, access and grant permission information of the corresponding user;

defining relationships between users based on the user profiles; and enabling a user who has the permission to do so, to manage defined relationships associated with the user by altering the profile for the user.

20. The method of claim 19 in which the permission information is stored as user profiles in the database.

21. The method of claim 19 in which the permissions comprise cascading permissions.

22. The method of claim 19 in which the users belong to entities and the database also stores information about permissions that define rights of all of the users who belong to a given one of the entities.

23. The method of claim 19 in which the database also stores information about aggregate permissions that comprise predefined sets of individual permissions.

24. A method comprising:

making at least one digital facility available from a source to users via an electronic communication medium;

maintaining a database of user profiles that define preferences of users and companies with respect to the digital facility and permissions of users and companies to access the digital facility;

authorizing at least one user to create user profiles for other users;

defining relationships between users based on the user profiles; and automatically making a user who creates a user profile for another user or for a company a relationship manager of defined relationships of the other user or the company.

* * * * *